United States Patent [19]
Hahn et al.

[11] Patent Number: 4,813,863
[45] Date of Patent: Mar. 21, 1989

[54] ROTARY EXTRUDER WITH A GEAR PUMP

[75] Inventors: Granville J. Hahn; Raleigh N. Rutledge, both of Big Spring, Tex.

[73] Assignee: Permian Research Corporation, Big Spring, Tex.

[21] Appl. No.: 831,805

[22] Filed: Feb. 21, 1986

[51] Int. Cl.$^4$ .............................................. B29B 7/42
[52] U.S. Cl. .............................. 425/205; 264/211.21; 264/349; 366/97; 366/99; 425/207; 425/209; 425/382.3
[58] Field of Search ................ 264/169, 211.1, 211.21, 264/310, 311, 349; 366/69, 97–99; 425/191, 192 R, 200, 201, 204, 207, 209, 224, 374, 376 B, 377, 378 R, 379 R, 205, 381.2, 382 R, 197–199, 382.3, 382.4, 378.1, 379.1

[56] References Cited

U.S. PATENT DOCUMENTS

| | | | |
|---|---|---|---|
| 2,941,239 | 6/1960 | Theysohn | 425/201 |
| 3,346,683 | 10/1967 | Plymale | 264/211.1 |
| 3,475,788 | 11/1969 | Heston | 425/377 |
| 3,524,628 | 8/1970 | Hendry | 264/328.14 |
| 3,609,806 | 10/1971 | Schippers | 425/197 |
| 3,632,702 | 1/1972 | Carrow | 264/148 |
| 3,732,345 | 5/1973 | Amos et al. | 264/176.1 |
| 3,790,328 | 2/1974 | Maxwell | 424/207 |
| 3,880,564 | 4/1975 | Beck et al. | 425/223 |
| 4,012,477 | 3/1977 | Beck et al. | 264/175 |
| 4,028,031 | 6/1977 | Seide | 264/40.4 |
| 4,101,613 | 7/1978 | Norwood | 264/40.4 |
| 4,189,291 | 2/1980 | Longhi | 264/37 |
| 4,194,841 | 3/1980 | Tadmor | 425/376 B |
| 4,213,709 | 7/1980 | Valsamis | 425/376 B |
| 4,237,082 | 12/1980 | LaSpisa et al. | 264/40.6 |
| 4,247,272 | 1/1981 | Anders | 425/147 |
| 4,304,537 | 12/1981 | Kirjavainen et al. | 425/113 |
| 4,336,213 | 6/1982 | Fox | 264/40.1 |
| 4,412,747 | 11/1983 | Moriyama | 277/81 R |
| 4,413,913 | 11/1983 | Hold et al. | 366/99 |
| 4,421,412 | 12/1983 | Hold et al. | 425/204 |
| 4,461,734 | 7/1984 | Jones et al. | 425/376 B |
| 4,501,543 | 2/1985 | Rutledge et al. | 425/191 |

FOREIGN PATENT DOCUMENTS 47-38559  9/1972  Japan.

OTHER PUBLICATIONS

*Plastics World*, May 1979, p. 54, "Simplified Screwless Extruder Concept to Improve Cost/Performance in the Manufacture of Sheet or Film".

Dr. James. F. Carley, *Modern Plastics*, May 1984, Technical Review "Starve-Fed Extrusion".

Primary Examiner—Jan H. Silbaugh
Assistant Examiner—Jill L. Heitbrink
Attorney, Agent, or Firm—Ross, Howison, Clapp & Korn

[57] ABSTRACT

Rotary extruder apparatus is provided comprising housing (22), recess (29) within housing (22), cylindrical rotor (30) rotatably mounted within recess (29) in housing (22), feed inlet (25), discharge outlet (52) providing fluid communication between recess (29) and diehead (26), in combination with gear pump (160) adapted to increase the pressure of material received from discharge outlet (52). Knurled rotor (30), undercut feed inlet (25), segmented rotor shafts (18, 18'), thrust rings (109, 109') made of dissimilar metals, and circumferentially spaced cartridge heaters (63) in housing (22) are also disclosed.

2 Claims, 7 Drawing Sheets

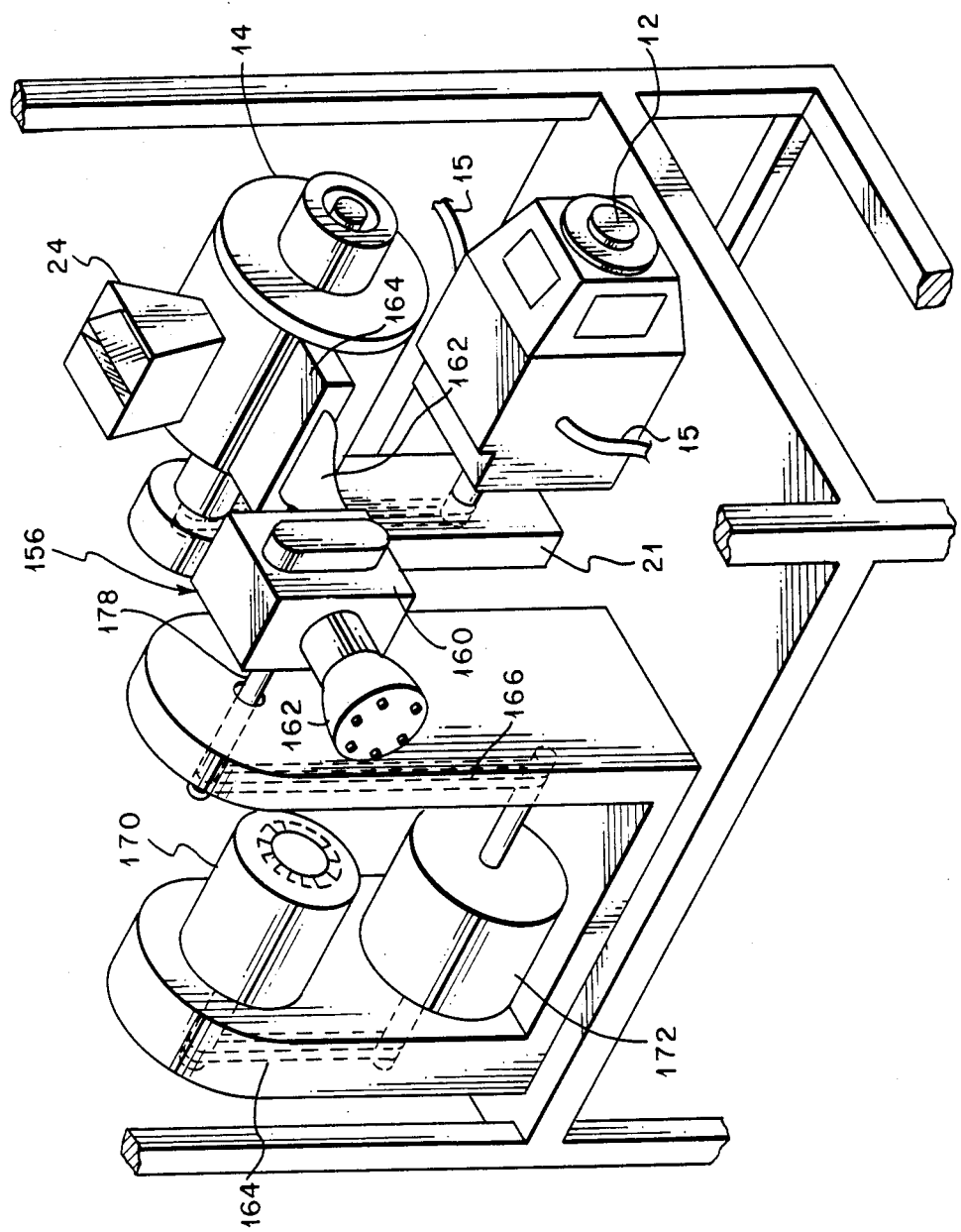

ROTARY EXTRUDER WITH A GEAR PUMP

BACKGROUND OF THE INVENTION

This invention relates to improvements in rotary extruders. Rotary extruders suitable for extruding thermoplastic materials have been disclosed previously in the following U.S. Pat Nos: 3,880,564; 4,012,477; and 4,501,543.

In using such extruders, problems have been encountered which have required new solutions. Some of these problems have resulted from thermal expansion of the rotor shaft and rotor housing. Other problems have arisen in feeding polymer into the rotary extruder. Still other problems have arisen due to insufficient polymer adhesion to the rotor surface. These and other problems have been largely obviated through use of the invention disclosed herein.

SUMMARY OF THE INVENTION

In order to overcome the problems and disadvantages referred to above, an apparatus is provided that significantly reduces the detrimental effects of thermal expansion, that materially enhances the manner in which polymer is fed into the rotary extruder, and that beneficially effects greater adhesion of melted polymer to the rotor surface.

According to one embodiment of the invention, a rotary extruder is provided that comprises spaced apart shaft members at each end of the rotor instead of a continuous, single shaft extending therethrough.

According to another embodiment of the invention, a rotary extruder is provided that comprises a discharge outlet further comprising a plurality of axially spaced cylindrical passageways instead of a single slot as previously disclosed.

According to another embodiment of the invention, a rotary extruder is provided wherein each end of the rotor and the associated end plate both contain press-fit thrust rings within counterbored receptacles, with the thrust rings on each end being in facing contact and made of dissimilar metals.

According to another embodiment of the invention, a rotary extruder is provided wherein that portion of the rotor surface disposed between the outlet grooves at one end and the outlet grooves at the opposite end is knurled.

According to another embodiment of the invention, a rotary extruder is provided wherein the angle of incidence between the lower portion of the forward facing wall of the feed inlet opening and a line drawn tangent to the inside wall of the rotor housing at the point of incidence is about 45°.

According to another embodiment of the invention, a rotary extruder is provided wherein the rotary extruder is mounted on a substantially horizontal underlying support member in such manner that a line passing through the feed inlet opening perpendicularly to the rotary surface is disposed at an angle about 55° rearward of vertical.

According to another embodiment of the invention, a rotary extruder is provided wherein a plurality of axially disposed, circumferentially spaced cartridge heaters are employed for heating the rotor housing.

BRIEF DESCRIPTION OF THE DRAWINGS

The apparatus of the invention is further described and explained in relation to the following drawings in which:

FIG. 9 is a perspective view of the rotary extruder apparatus directly connected to a pressure augmenting system.

DETAILED DESCRIPTION OF THE PREFERRED EMBODIMENTS

Figure 1:
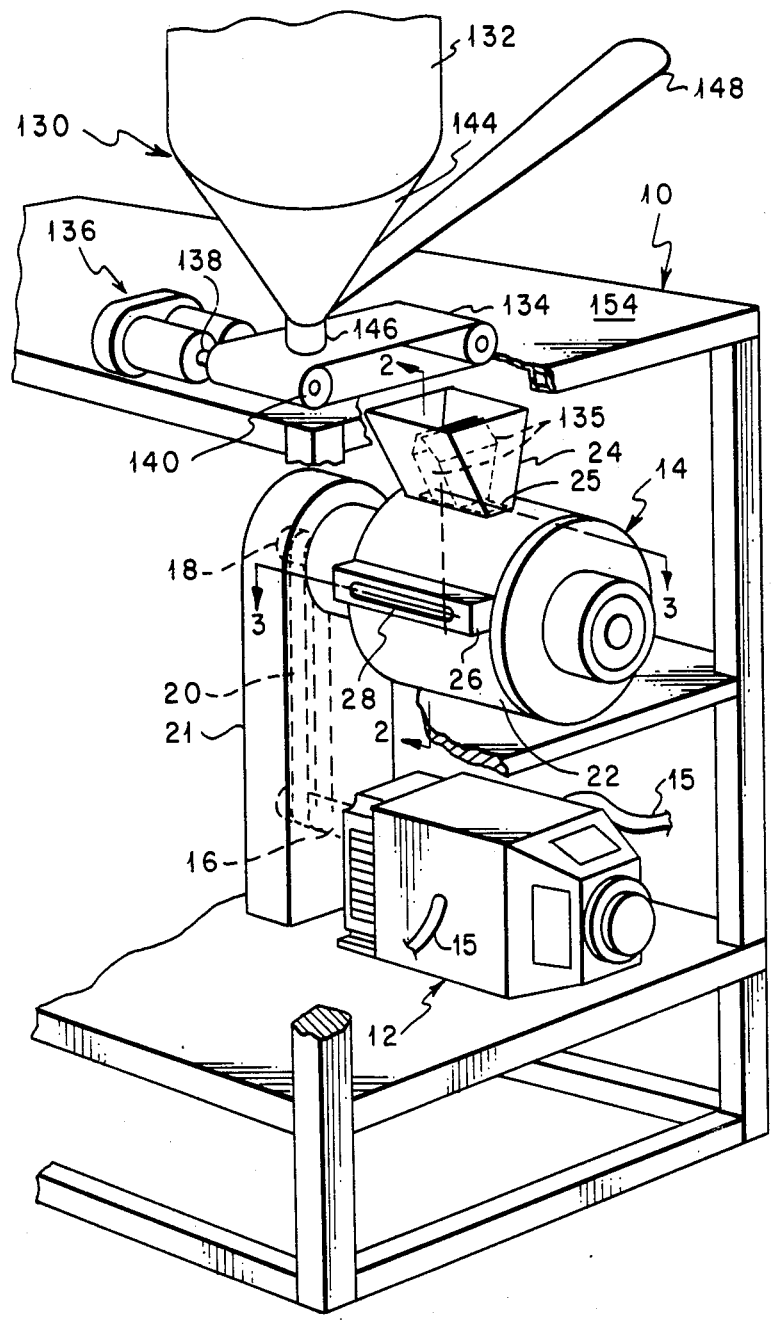
FIG. 1 is a simplified perspective view illustrating the feed assembly, rotary extruder and supporting structure.

Referring now to FIG. 1, there is shown an apparatus designed to produce thermoplastic sheet by means of a supporting structure or frame 10, having mounted thereon an electrical drive motor 12, and a rotary extruder 14. Drive motor 12 and rotary extruder 14 include drive shaft 16 and rotary shaft 18 respectively extending therefrom, and a drive belt 20 connecting shafts 16 and 18 to transmit rotary motion from a drive motor 12 to rotary extruder 14. Cover 21 encloses shafts 16 and 18 and drive belt or chain 20 to provide added protection to the operator and personnel. Drive motor 12 may be a variable speed hydraulic motor such as the K-2500-V manufactured by North American Hydraulics, Inc., receiving and delivering pressurized fluid through hydraulic lines 15 from an electric motor and pump (not shown in drawing). Rotary extruder 14 includes a housing 22 affixed to supporting structure or frame 10 and having a feed chute 24 fixed atop housing 22 for delivery of the thermoplastic material to rotary extruder 14 through feed inlet opening 25. A diehead 26 located at the discharge end of extruder 14 has a slot-shaped opening 28 through which the melted thermoplstic material is extruded in order to provide the desired shape material. Also desirable but not shown in the drawings, is a water vat for cooling the thermoplastic material and a series of opposing rollers for pulling the material through the water vat and into storage.

Thermoplastic material suitable for use by the present invention include all extrudable plastic materials such as cellulose esters and ethers such as ethyl cellulose acetate, acetobutyrate, and acetopropionate; vinyl and vinylidene polymers and copolymers such as polymers and copolymers of vinyl chloride, vinyl acetate, vinylidene chloride, polyvinyl alcohol, polyvinyl butyral; and polymers and copolymers of acrylic and methacrylic esters; polymers and copolymers of olefins, such as ethylene, propylene, and butylene; polymers and copolymers of styrene, 2-methyl styrene and their mixtures of elastomeric copolymers; polyamides, interpolyamides such as polyhexamethylene adipamide, polyundecanamide, polyhexamethylenesebacamide; polycarbonates; polyaldehydes; polyethers; polyurethanes; polyesters; natural and synthetic elastomers; thermoplastic fluorinated resins; silicon resins and elastomers, nylons and polyethylene terephthalate. Preferably, however, polypropylene, polyethylene terephthalate, or the polystyrenes and their copolymers and elastomers, such as polystyrene, styrene-acrylonitrile copolymers (SAN), styrenebutadiene-acrylonitrile-copolymers (ABS) and methacrylate-styrene rubber copolymers are employed. These plastic materials can, of course, be used in admixture with fillers, plasticizers, colorants, or other ordinary additives, provided they are in a state permitting melt extrusion.

Figure 2:
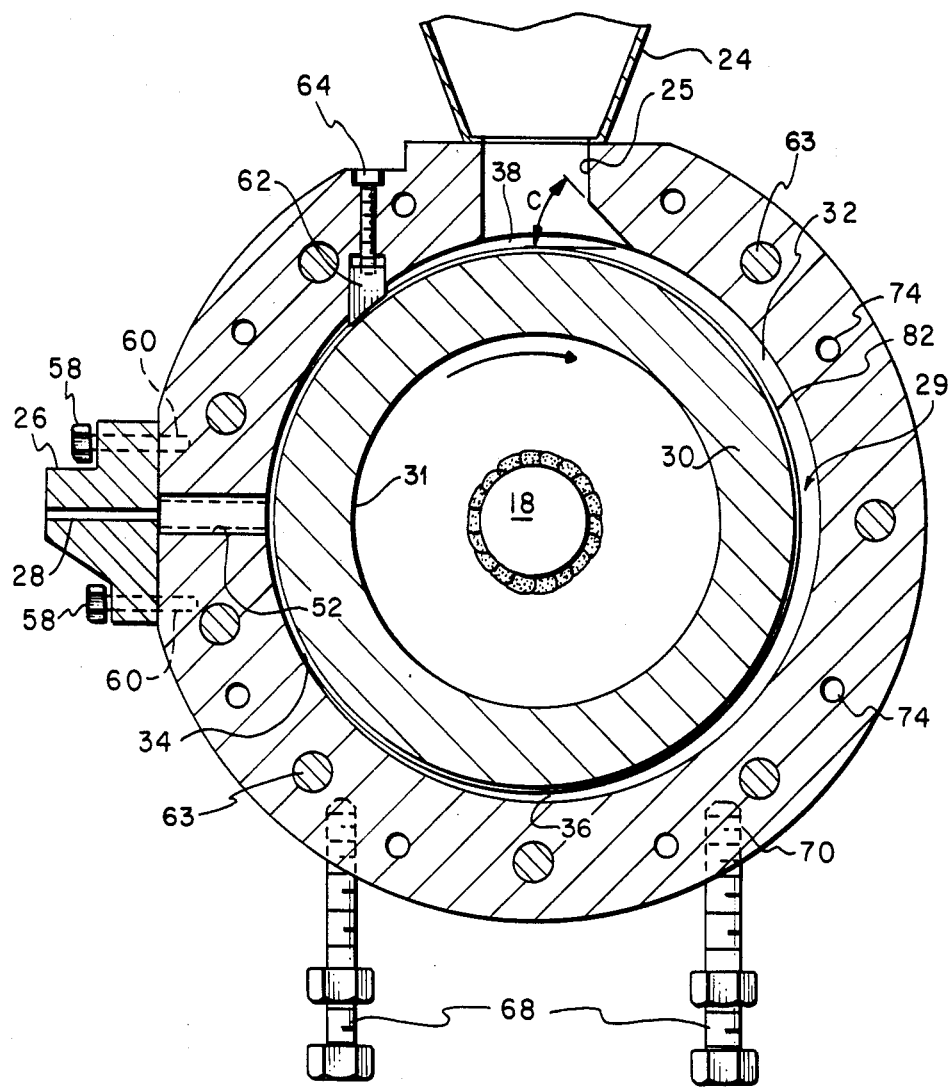
FIG. 2 is a cross-sectional axial view of the subject rotary extruder.
Figure 2A:
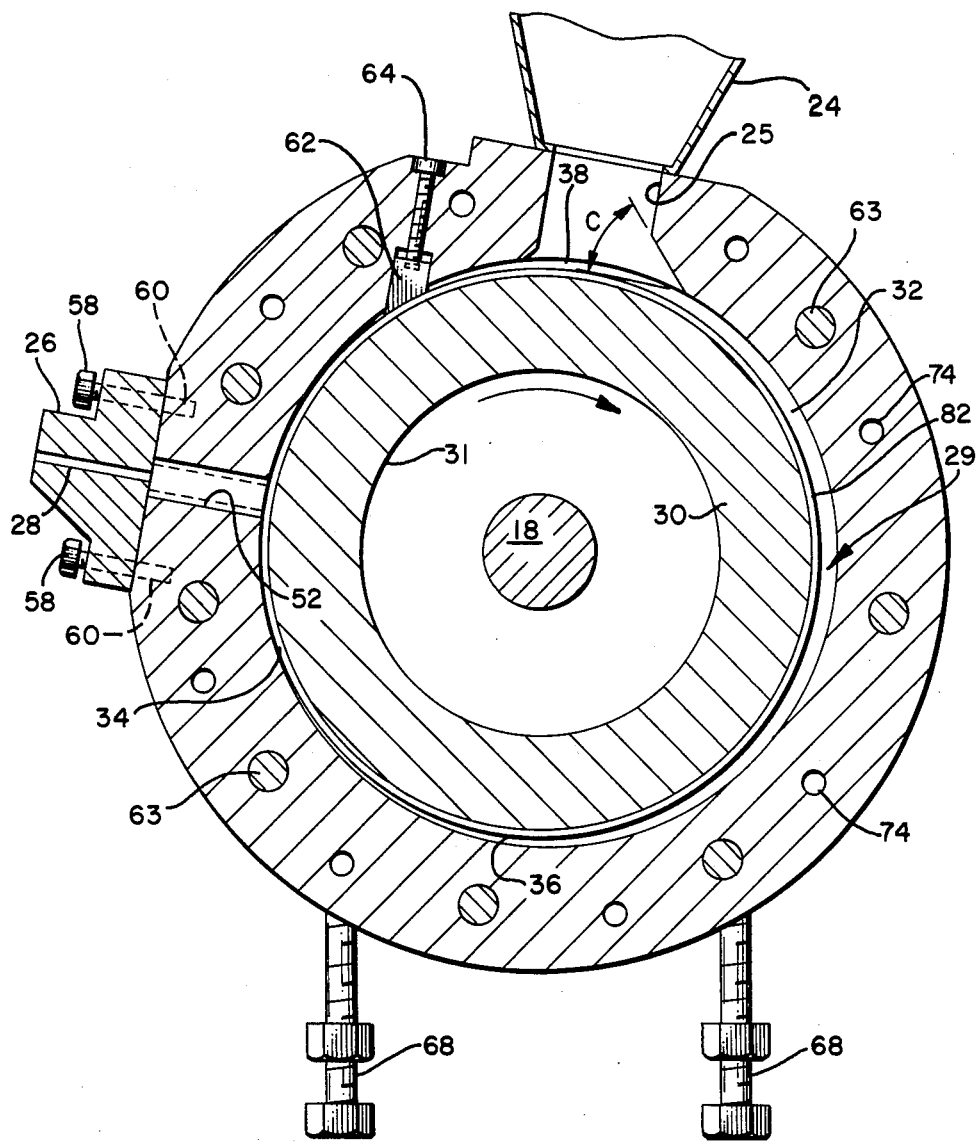
FIG. 2a is a cross-sectional axial view of the subject rotary extruder mounted about 15° rearward of vertical.

Rotary extruder 14 is shown in greater detail by FIG. 2, showing housing 22 having an interior bore 29 for placement of a drum or rotor 30 supported by axially spaced rotary shaft members 18 (further shown in FIG. 3) for clockwise rotational motion within housing 22. Although interior bore 29 may be cylindrically shaped, an elliptically shaped interior bore 29 is preferred for reasons to be discussed later. Rotor 30 longitudinally extends the length of housing 22 and is connected in fixed coaxial relation to axially spaced rotary shaft members 18 such that shaft members 18 and rotor 30 rotate in unison. Rotor 30 is coaxially positioned within the elliptical bore 29 of housing 22 in order to create two arc-like gaps having different clearances defined by the distance between the inside surface of housing 22 and the outside surface of rotor 30. Beginning clockwise from the feed inlet opening 25 is the first arc-like gap of approximate uniform clearance, hereinafter referred to as the feed section 32, terminating at approximately the 4 o'clock position. Beginning at approximately the 7 o'clock position and continuing clockwise to the discharge opening 52 located at approximately the 9 o'clock position, is a second narrower arc-like gap of approximate uniform clearance, hereinafter referred to as the compression section 34. Between the feed section 32 and the compression section 34 is transitional section 36 having a tapered clearance to provide a smooth transition between the feed and compression sections. The feed section 32 and compression section 34 each define approximately 17 to 33 degrees of the 360 degrees rotation of rotor 30. As mentioned previously, the differences in clearance between the feed and compression sections are desirable to accommodate different types of polymer which have different melting characteristics. Often the relationship between clearances is expressed as the ratio of the feed clearance to the compression clearance. For example, when extruding ABS a ratio of from 2.0-2.5:1 has been found to work best; for styrene, a ratio of from 3.5-4.5:1 works well; for polypropylene, a ratio of about 4:1 is satisfactory. Therefore, in a rotary extruder having a rotor diameter of about 12 inches and an effective rotor length of 14 inches, sometimes referred to as a 12"×14" rotary extruder, it has been found that when extruding polypropylene, a feed section clearance of 0.450-0.600 inch and a compression clearance of about 0.100-0.140 inch works well, giving feed section to compression section ratio of about 4 to 1. It should be appreciated that an elliptically shaped interior area 29 helps further define the arc-like shape of feed section 32 and compression section 34 while reducing the arc-length of the transition section 36.

Extending through housing 22, at approximately the 12 o'clock position, is feed opening 25 in communication with interior bore 29 for the purpose of directing thermoplastic material delivered from chute 24 directly onto rotor 30 positioned therebelow. Feed opening 25 longitudinally traverses housing 22 between pump rings 82, 84 (to be discussed later) to insure that thermoplastic material delivered from chute 24 is delivered along the majority of the length of rotor 30. The diehead 26 positioned at approximately the 9 o'clock position, is secured to housing 22 by bolts 58 inserted through threaded slots 60 of housing 22. Diehead 26 includes a die slot 28 in communication with discharge outlet 52. Discharge outlet 52 preferably comprises a plurality of longitudinally spaced cylindrical passageways extending outwardly from interior bore 29 of housing 22 toward die slot 28 of diehead 26. According to a particularly preferred embodiment of the invention, the diameter of the cylindrical passageways of discharge outlet 52 is smaller near the middle of rotor 30 and larger near the ends of rotor 30 to promote more balanced flow of thermoplastic melt through diehead 26. Die slot 28 of diehead 26 is sufficiently narrow to provide a film or sheet-like extrudate therethrough. Other types of dies, such as strand dies, foam dies, tubular dies, and profile dies, may be used in place of the sheet die without detracting from the present invention. The use of spaced cylindrical passageways in lieu of a slot for discharge outlet 52 helps maintain the dimensional stability of housing 22 during extrusion because of the webs of metal retained between adjacent passageways.

According to another preferred embodiment of the invention, extruder housing 22 is desirably rotated about 15 degrees in a clockwise direction from the position shown in FIG. 2. Rotation of housing 22 in this manner has been found to improve the feed characteristics of the rotary extruder, especially when the wall of feed opening 25 is undercut in the direction of rotation by an angle C of about 45 degrees, as shown in FIG. 2. Mounting bolts 68 connect housing 22 to frame 10 through mounting threaded slots 70 on the underside of housing 22, it being understood that the placement of threaded slots 70 will be 15 degrees in a counterclockwise direction from the position shown in FIG. 2 for the embodiment where housing 22 is rotated 15 degrees in a clockwise direction. Other means for mounting the rotary extruder of the invention on an underlying support member are similarly effective, it being understood that the mounting means should preferably minimize the surface contact with extruder housing 22 and the attendant heat loss.

Positioned inside housing 22 between the discharge opening 52 and feed inlet opening 25 and located above the surface of rotor 30 is restricter bar 62. Restricter bar 62 is designed to limit the amount of melted polymer carried back to feed inlet 25 by rotor 30 after rotating past discharge outlet 52. Restricter bar is maintained in fixed position relative to housing 22 by longitudinally spaced screws 64. A gap of about 0.030 inch between restricter bar 62 and the surface of rotor 30 is believed to be satisfactory for extruding polypropylene. It should be appreciated that discharge outlet 52 and diehead 26 may be located in close proximity to restricter bar 62 at the approximate 11 o'clock position without detracting from the invention. By so doing, the thermoplastic melt is subjected to an additional 60 degrees of arc travel to provide additional heating time.

According to one preferred embodiment of the invention, as shown in FIG. 2, a plurality of cartridge heaters 63 are inserted into circumferentially spaced, longitudinally extending bores in housing 22 to provide even heating around rotor 30. Cartridge heaters 63 about 0.75 inch in diameter and delivering a total of about 15 to twenty thousand watts are believed to be satisfactory for heating a 12×14" rotary extruder.

For the rotary extruders of the present invention, the following equation can be applied to their design and operation:

$$\text{Output (lbs/hours)} = NPHD^2k$$

where N=the specific gravity of the polymer used, P=the pump depth, which is the distance between the outer surface of the rotor and the inner surface of the housing, H=the revolutions per minute of the rotor, D=the diameter of the housing, and k=the viscosity constant for a given polymer, for example the viscosity constant of high impact polystyrene is 2.3. It should be appreciated from the above equation that the basic principles governing the screw extruder must also be applied to the rotary extruder for it to operate properly The maximum output is limited by the rotational velocity of the rotor which in turn is limited by the ability of the bearings to support the rotor 22 as it turns at a high velocity. Generally, however, it has been found that a rotor velocity ranging from about 50 to 150 rpm works satisfactorily.

Figure 3:
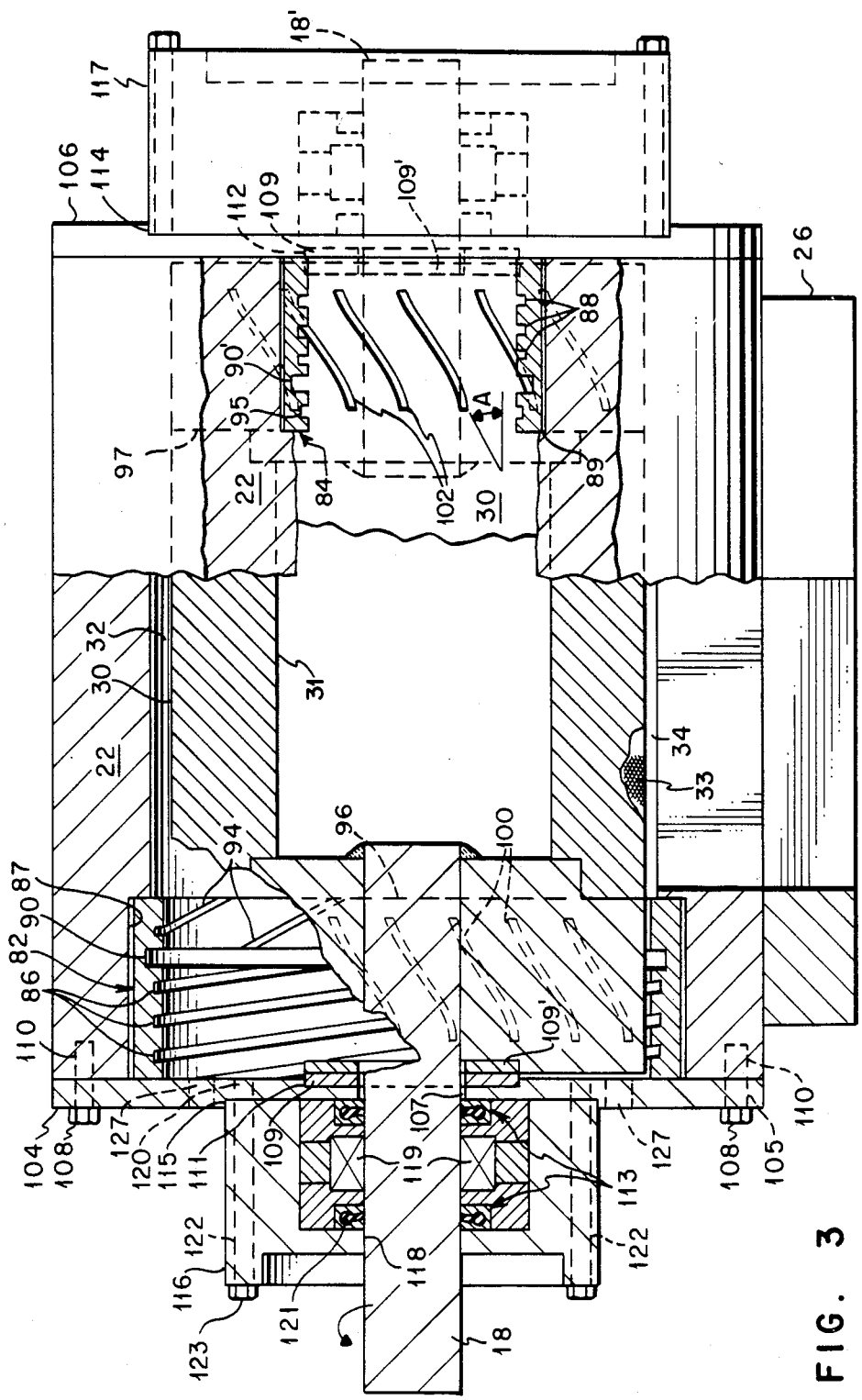
FIG. 3 is a top cross-sectional view of the subject rotary extruder.

In order to further describe rotary extruder 14 and its internal structure, refer now to FIG. 3 illustrating a top cross-sectional view of the rotary extruder. Affixed at opposite ends of housing 22 within housing interior section 29 are port and starboard pump rings, generally illustrated as 82 and 84 respectively, sized to fit within port and starboard counterbore receptacles 87, 89 milled into the inside surface of housing 22 at opposite ends thereof; the outside diameter of pump rings 82, 84 being sized approximately 0.5 inch less than the diameter of counterbore receptacles 87, 89 to allow some radial clearance of the pump rings when the axial position of shaft 18 and rotor 30 are changed. Pump rings 82, 84 are held in place in counterbore receptacles 87, 89 by end plates 104, 106 in a manner to be described later.

Figure 4:
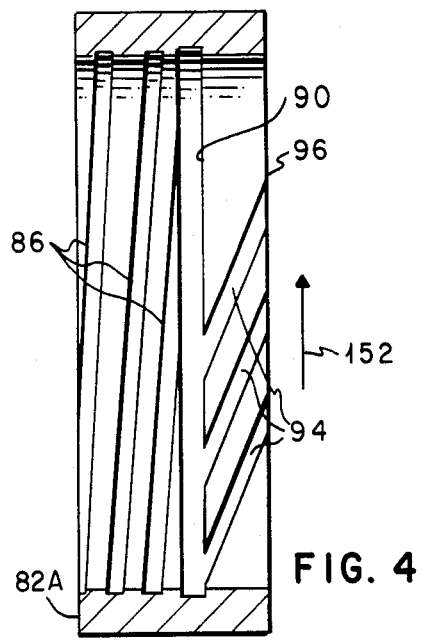
FIGS. 4 and 5 are cross-sectional views of the port pump ring illustrating the channeling grooves, central collecting groove, and outlet grooves.
Figure 5:
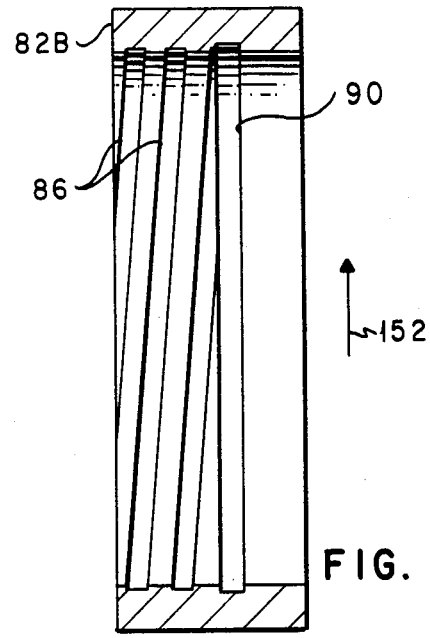
Figure 6:
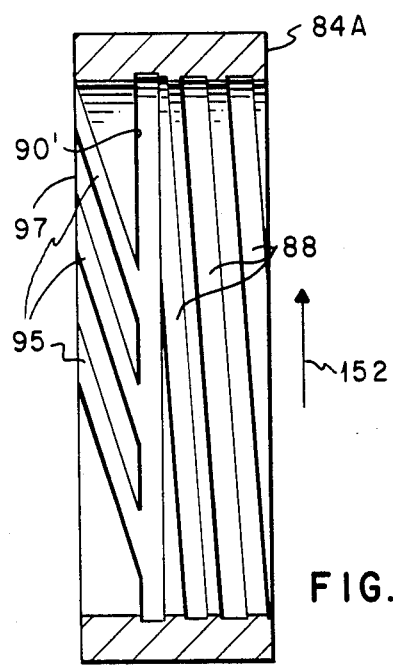
FIGS. 6 and 7 are cross-sectional views of the starboard pump ring.
Figure 7:
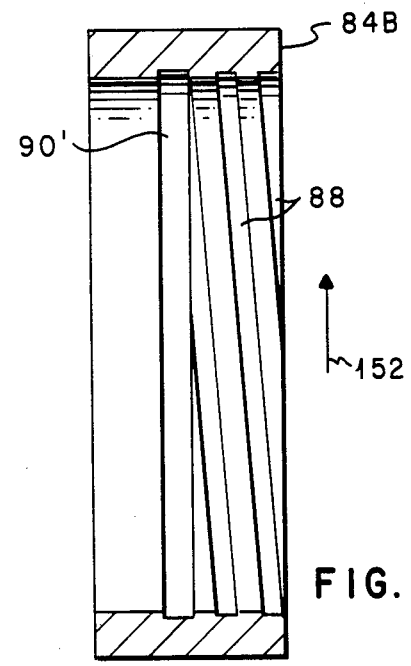

Pump ring 82 is further illustrated in cross section in FIGS. 4 and 5 which we now refer to. Port ring 82 divided for illustration purposes into semicircular rings 82A, illustrated in FIG. 4, and 82B illustrated in FIG. 5, may be made from a steel alloy. Port pump half rings 82A and 82B, positioned inside housing 22 at the left end thereof when viewing FIG. 3, include a plurality of helical right hand grooves, hereinafter referred to as port channeling grooves 86, located on the inside surface thereof and communicating with a central collecting groove 90 positioned inboard of grooves 86 and circulating about the inside surface of ring 82 for a continuous 360°. By right hand grooves it is meant that by looking axially from the left end of the extruder in FIG. 3, a clockwise rotation around port channeling grooves 86 would cause an inward advancement into the housing 22, and a counterclockwise rotation around grooves 86 would result in an outward advancement. Port ring 82A is distinguished from 82B by helical right hand outlet grooves 94 located inboard of and communicating with central groove 90 and extending to the inner edge 96 of port ring 82A; port ring 82 being positioned inside housing 22 such that the outlet grooves 94 are in communication with feed section 32. Referring now to FIGS. 6 and 7, shown there is starboard pump ring 84, divided for illustration purposes into semicircular rings 84A, illustrated in FIG. 6, and 84B, illustrated in FIG. 7, positioned at the right end of shaft 18 inside housing 22. Starboard semicircular rings 84A and 84B include a plurality of left hand helical grooves, hereinafter referred to as starboard channeling grooves 88, on the inside surface thereof, communicating with a central collecting groove 90' positioned inboard of grooves 88 and circulating about the inside surface of ring 84 for a continuous 360°. By left hand grooves it is meant that by looking axially from the left end of the extruder in FIG. 3, a counterclockwise rotation around starboard channeling grooves 88 would cause an inward advancement into the housing 22 and a clockwise rotation around the grooves 88 would cause an outward advancement. Starboard semicircular ring 84A is distinguished from ring 84B by helical left hand outlet grooves 95 positioned inboard of and communicating with central groove 90' and extending to inner edge 97 of the starboard ring 84A; ring 84 being positioned inside housing 22 such that outlet grooves 95 are in communication with feed section 32. Helical grooves 86, 88 measure in width approximately 0.109 inch, a depth of approximately 0.125 to 0.1875 inch, with a distance of approximately 0.25 inch between the center line of each groove. Central grooves 90, 90' are approximately 0.5 inch wide with a depth of approximately 0.125 inch. Outlet grooves 94, 95 measure approximately 0.25 inch in width with approximately a 0.25 inch depth. Other groove sizes may be used without detracting from the present invention, however, helical grooves 86, 88 should be designed so that after one revolution about rings 82, 84, any melt remaining in grooves 86, 88 will be directed into central grooves 90, 90'.

Returning now to FIG. 3, it can be seen that formed into the surface of rotor 30 about its circumference inside starboard pump ring 84 and starboard channeling grooves 88 are a plurality of starboard directing grooves 102, angularly positioned on rotor 30 such that when rotor 30 is rotated in an upward rotational direction as viewed in FIG. 3 or a clockwise direction as viewed in FIG. 2, a vector force is imparted to the thermoplastic material both in an upward rotational direction and in an axial direction towards the center of housing 22. It should be appreciated that as rotor 30 rotates in an upward rotational direction directing grooves 102 work in rotational combination with grooves 88 to force thermoplastic material along grooves 88 by means of a wiping action both in an axial direction toward the center of housing 22 and in a clockwise rotational direction, the melt eventually reaching central groove 90' where it continues to be directed in a clockwise rotational direction. As the thermoplastic material is forced along in central groove 90 by the rotational force imparted by directing grooves 102, it is discharged through outlet groove 95 by the combined axial and rotational forces imparted by directing grooves 102 and toward the center of housing 22 and into the feed section 32.

In a similar manner, port directing grooves 100 include a plurality of grooves about the circumference of rotor 30 opposite the inside surface of port pump ring 82 and port channeling grooves 86. Grooves 86 are angularly positioned on rotor 30 such that when rotor 30 is rotated in an upward rotational direction as viewed in FIG. 3 or a clockwise direction as viewed in FIG. 2, a vector force is imparted to the thermoplastic material both in an upward rotational direction and an axial direction toward the center of housing 22. As rotor 30 moves in the upward rotational direction, port directing grooves 100 work in rotational combination with port channeling grooves 86 to force thermoplastic material along grooves 86 in an axial direction toward the center of housing 22 and in a rotational direction into and along central groove 90. As the thermoplastic material is collected in central groove 90, it is discharged through outlet grooves 94 by the rotational force from directing grooves 100, toward the center of housing 22 and into feed section 32. Directing grooves 100, 102 may be approximately 0.25 inch wide, with approximately an inch between their respective center lines. It should be appreciated that the exact thrust angle A in FIG. 3 of the directing grooves 100, 102 defined by an imaginary center line drawn parallel to the rotor axis through the grooves 100, 102, intersecting a line drawn along grooves 100, 102, is not critical. It is important, however, that grooves 100, 102 be angularly positioned such that when rotor 30 is rotated in an upward direction in FIG. 3, vector forces are imparted to the thermoplastic melt both in an upward direction and inward direction toward the center of housing 22. A thrust angle A between about 20 degrees and about 70 degrees would provide the necessary rotational and axial directing forces, however, a thrust angle A between about 20 degrees and about 25 degrees is preferred.

In addition, it is preferred that the distance between the inner surface of pump rings 116, 117 and the outer surface of rotor 30 be between 0.005 inch to 0.020 inch per side for extruding thermoplastic material, with about 0.008 inch per side being preferred for extruding polypropylene. A lesser clearance places too much drag on the rotor 30, a greater clearance may result in some leakage from housing 22.

Referring to FIG. 3, rotor 30 preferably comprises internal bore 31. For a twelve inch diameter rotor 30, an internal bore 31 of about 7 inches is preferred. Shaft 18 preferably comprises two axially spaced shaft members 18, 18' in place of the single, unitary shaft as previously disclosed in U.S. Pat. No. 4,501,543. The use of two spaced apart shaft members 18, 18' connected in fixed relation to the ends of rotor 30 in place of a single shaft is believed to be beneficial in overcoming problems previously associated with the operation of rotary extruders. Knurling 33 disposed on the outward facing surface of rotor 30 between rings 82, 84 is effective for increasing the amount of polymer pulled through bore 29 (FIG. 2) by the rotation of rotor 30 within housing 22.

Figure 8:
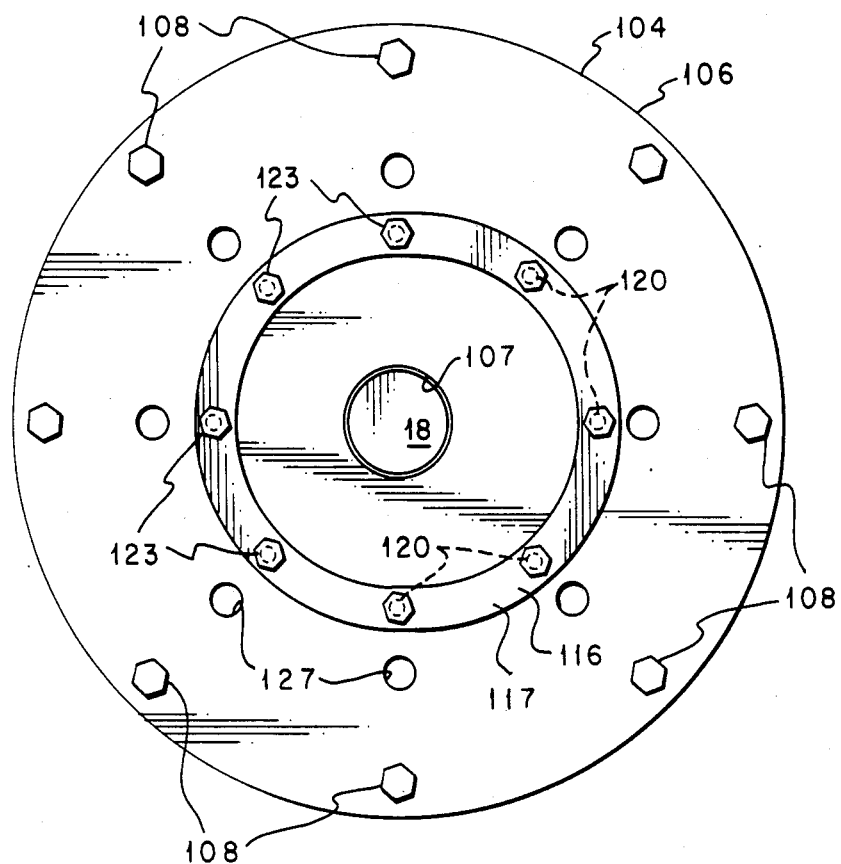
FIG. 8 is an axial view of the end plate and bearing housing of the subject rotary extruder.

Referring now to FIGS. 3 and 8, housing 22 is enclosed at opposite ends by port and starboard end plates 104 and 106 respectively. Thrust rings 109 are press-fit within thrust ring counterbore receptacles 111, 112 which are milled into the inside surface of end plates 104, 106 to prevent axial movement of shaft 18. Thrust rings 109' are press-fit into receptacles counterbored into the ends of rotor 30 opposite thrust rings 109. Particularly desirable results are achieved in reducing friction between the end of rotor 30 and end plates 104, 106 of housing 22 where thrust rings 109 are constructed from AISI H13 tool steel (hardened and ground) and thrust rings 109' are constructed from aluminum bronze (Wiscon—Cast WCF 175). End plates 104 and 106 include bores 107 for insertion of rotary shaft 18 therethrough; the end plates being secured to housing 22 by bolts 108 screwed into threaded mounting holes 110. Rotary shaft members 18, 18' are positioned within bearing channel 118 of port and starboard bearing housing 116 and 117 respectively, and supported therein for rotational movement by bearings 119 held in place by seal rings 113 on either side thereof. Seal rings 113 also serve to prevent migration of lubricant out of the bearings and prevent contamination entering the bearings from the extruder or from the atmosphere. Bearing housings 116, 117 fitted within counterbore receptacles 115 milled into the outside surface of end plates 104, 106, support rotary shafts 18, 18' at opposite ends of housing 22. Bearing housings 116, 117 are secured to the outside of end plates 104, 106 respectively by bolts 123 inserted through bearing housing holes 120 and into end plate threaded holes 122. Bearing housings 116, 117 may enclose roller type bearings rated to about 100,000 pounds to support rotary shaft members 18, 18' at opposite ends. Included also in bearing housings 116, 117 are water cooling holes 121 for circulation of cooling water throughout bearing housings 116, 117. Bearing housings 116, 117 can also be cooled effectively by the addition of external collars containing a circulating coolant.

In a preferred embodiment illustrated by FIGS. 3 and 8, bearing housing shaft channel 118 is located axially off center inside bearing housing 116, 117. End plates 104, 106 have a plurality of bearing housing repositioning hole 120 including bolts 123 threadably engaged therein for repositioning bearing housing 116, 117 at various locations relative to end plates 104, 106; repositioning holes 120 being concentrically oriented about shaft bore 107 and aligning with bearing housing holes 122 for engagement of bolt 123 therethrough. By closer observation, it can be appreciated that rotationally repositioning bearing housings 116, 117 relative to end plates 104, 106 by use of repositioning holes 120, the off center location of channel 118 allows the position of shaft members 18, 18' and hence the position of rotor 30 within housing 22 to be changed, thereby varying the size and shape of feed section 32 and compression section 34. It should be appreciated that the diameter of bore 107 is sufficiently large to permit lateral repositioning of shaft members 18, 18' therewithin. What has been achieved is a simple method of varying the feed section and compression section clearances of the rotary extruder to accommodate different types of thermoplastic material extruded therethrough. In fact, the position of bearing housing 116, 117 relative to repositioning holes 120 may be calculated to achieve fixed ratios and labeled as such so that the repositioning of the bearing housings is relatively simple, thereby achieving an exactly or precisely determined ration without the need for minor adjustments and the misalignments created in other rotary extruders. In one preferred embodiment, depicted in FIG. 8, utilizing eight repositioning holes 120, it is possible to change feed to pump ratios by rotating bearing housings 116, 117. The bearing housings 116, 117 may be repositioned simply by loosening bolts 108 of end plates 104, 106 to allow lateral movement of pump rings 82, 84 respectively, then removing bolts 123 holding bearing housings 116, 117 to achieve the desired feed/compression ratio. Then bolts 123 are reinserted in bearing housing holes 122 engaging repositioning holes 120, and bolts 108 are retightened in end plates 104, 106. As mentioned previously, the outside diameter of pump rings 104, 106 is approximately ½ inch less than the inside diameter of counterbore receptacles 87, 89, to allow radial realignment of the pump rings 104, 106 and provide adequate space between the inside surface of housing 22 and rotor 30 after rotor 30 has been repositioned. When the feed to pump ratio is changed, the pump rings should stay in the same location.

Included in end plates 104, 106 are a plurality of spillage holes 127 concentrically located about bore hole 107 for the escape of any volatiles from housing 22. Holes 127 may also serve as emergency thermoplastic melt spillage outlets in the event the pump rings malfunction.

Returning now to FIG. 1, there is shown a feed assembly 130, including a feed chute 24 located atop extruder housing 22 which receives thermoplastic material from an overhead feed hopper 132 by gravity flow to endless belt 134 located thereunder; feed belt 134 being driven by feed motor 136 connected to feed belt 134 by means of drive shaft 138 and roller 140. Surprisingly, flood feeding of thermoplastic melt to the housing 22 and rotor 30 will prevent proper operation of the extruder. It has been found that contact of the pellets with the thermoplastic melt clinging to the surface of the rotor 30 is important for their proper heating and shearing. Flood feeding overloads the surface of the rotor with too many pellets resulting in buildup of pellets above the surface of rotor 30; on the other hand, selectively feeding the pellets to the housing 22 assures greater contact between the pellets and the melt. It should be appreciated that feed chute 24 encloses feed inlet opening 25 which exposes a majority of the length of rotor 30 to the thermoplastic feed thereby insuring distribution across its length. Feed belt 134 has a width slightly smaller than that of feed chute 24 to help distribute thermoplastic material across rotor 30. Included within feed chute 24 are a plurality of feed distribution plates 135 vertically positioned there to laterally divide chute 24. Distribution plates 135 may be bent inwardly toward the middle of chute 24 to deflect thermoplastic material from the middle of chute 24 towards the ends thereof to provide a more uniform distribution of feed across rotor 30. Overhead feed hopper 132 includes inverted cone 144 having delivery feed nozzle 146 at the apex thereof. The delivery rate of feed from hopper 132 is controlled by the speed of belt 134. The vertical position of feed nozzle 146 relative to belt 134 is adjustable to allow for variations in the size of the thermoplastic pellets, by vertical adjustment of feed hopper 132. A vertical distance between the tip of feed nozzle 146 and feed belt 132 of approximately 1½ times the pellet size insures adequate supply of feed to belt 132 without allowing thermoplastic material to overflow from belt 132. Feed chute 24 also includes water cooling holes (not shown) for circulation of water therethrough to prevent heat buildup in the feed held there. In addition, warm air conduit 148 directs warm air at approximately 175° F. from a heater fan (not shown in drawings) into feed hopper 132 in proximity to feed nozzle 146. The warm air eliminates moisture between the thermoplastic particles which often shows up as pock marks on the extruded thermoplastic film. The temperature of the warm air is kept sufficiently low so that there is no melting of the thermoplastic feed within hopper 132. However, the increased temperature does allow a higher throughput since the plastic material is elevated closer to its melt temperature.

Operation of the apparatus proceeds as follows: Referring now to FIG. 1, thermoplastic material is delivered to overhead feed hopper 132 by means of either a conveyor belt, by other mechanical means, or manually. Thermoplastic feed falls by gravity flow through feed nozzle 146 to the surface of rotating feed belt 134 and from belt 134 into feed chute 24 located directly beneath the delivery end of feed belt 134 as it rotates in a clockwise manner as depicted in FIG. 1. The delivery rate of thermoplastic feed to feed chute 24 is determined by the rotational velocity of belt 134 It should be noted that feed motor 136 and feed belt 134 are supported upon shelf 154 which has an opening cut therein to allow the thermoplastic feed to be delivered to feed chute 24.

Prior to beginning delivery of thermoplastic feed into feed chute 24, warm air is directed from a heater fan through conduit 148. Drive motor 12 is engaged to deliver rotary power to rotary extruder 14 by means of drive belt 20. When rotary extruder 14 has reached operating speed, delivery of thermoplastic material to feed chute 24 is begun.

Referring now to FIG. 2, with rotor 30 being driven in a clockwise direction, thermoplastic feed gravity falls through feed inlet opening 25 onto the surface of rotor 30. Restricter bar 62 is positioned to allow some of the thermoplastic melt sticking to rotor 30 to return to feed opening 25 thereby providing a sticky surface for the thermoplastic feed to cling to, resulting in a faster rate of throughput and some shearing action due to the loose thermoplastic material rubbing against the thermoplastic material stuck to the surface of rotor 30. If the melt exiting die 26 contains some unmelted or partially melted pellets, then restricter bar 62 can be raised to decrease the quantity of material forced out slot 28, thereby maintaining greater melt and heat inside housing 22. On the other hand, if the temperature of the melt exiting die 26 is too high, restricter bar 62 can be lowered to force more melt to exit housing 22, thereby decreasing the total melt and heat therein. Although restricter bars 62 with adjustable screws can be utilized, problems with chattering have been encountered, and the use of a fix restricter bar is preferred where possible.

Clockwise movement of rotor 30 carries the feed into feed section 32 where heating of the feed occurs. As the pellets impact the sticky thermoplastic melt clinging to rotor 30, they are rapidly heated. Vapors from the heated melt and from the expanded air around the heated pellets is expelled out inlet 25 and feed chute 24. As rotor 30 continues to rotate, the partially heated thermoplastic feed is carried therewith through transition zone 36 into the narrower compression section 34 wherein the majority of the heating and melting of the feed takes place due to its compression in the reduced clearance between the rotor 30 and housing 22 and the resulting increased pressure therein. It should be appreciated that there are no clearly defined limits between feed section 32 and compression section 34; therefore, some of the heating action previously described will occur in the transitional section 36 located therebetween. Further clockwise rotation of rotor 30 carries the thermoplastic material to discharge outlet 52 where the material is forced to exit through die 56. Feed attempting to continue past discharge outlet 52 is blocked by restricter bar 62 positioned above the surface of rotor 30. Restricter bar 62 is preferably set to permit a small portion of feed to be rotated past the restricter bar to provide a continuous thin layer of melt on rotor 30 as previously described. The thermoplastic melt is then forced through discharge outlet 52 into die slot 56, the feed is extruded into the final shape determined by die slot 28.

As mentioned previously, a significant problem with other extruders resulted when thermoplastic melt was forced out the opposite ends of housing 22 through shaft bore 107. In the present invention, end plates 104, 106 and port and starboard pump rings 82, 84 provide a barrier to the axial outward flow of thermoplastic melt. As illustrated in FIGS. 3 through 7, pump rings 82 and 84 are unique in that they redirect and rechannel thermoplastic melt away from the end plates and back into the feed section 32. This recycling of the excess thermoplastic melt is accomplished by the channeling grooves 86, 88 located on the inside surfaces of the pump rings 82, 84, with arrows 152 indicating the direction of melt travel around pump rings 82, 84. As previously described, port pump ring 82 contains right hand helical grooves 86 which have a component in the direction of rotation of rotary shaft members 18, 18' and an axial component away from end plate 104 towards the center of housing 22. Conversely, starboard pump ring 84 contains left handed helical grooves 88 which also direct the thermoplastic melt away from end plate 106 in a direction towards the center of housing 22. As the melt is directed inwardly, it is collected in a larger central collecting channels 90, 90' in communication with outlet grooves 94, 95 exiting into the feed section 32.

Working in conjunction with the grooves and pump rings 82 and 84 are directing grooves 100 and 102 positioned on the port and starboard ends of the rotor 30, rotating with rotor 30 to provide a pushing force for the thermoplastic melt along grooves 86, 88, into and along central grooves 90, 90' and outlet grooves 94, 95, and into feed section 32. The combined thrust and axial forces of the pump rings and the directing grooves provide the necessary force to propel the thermoplastic melt away from the end plates and into the feed section 32.

In another embodiment of the invention depicted in FIG. 9, a pressure discharge augmenting system 156, is positioned in communication with rotary extruder 14 at the discharge end thereof. The discharge pressure from rotary extruder 14 will generally be between 225 psi to 250 psi which is sufficient for the extrusion of the thermoplastic materials mentioned previously. However in some instances, a higher discharge pressure has been found to be necessary to extrude through certain high pressure dies, such as a strand die, which requires an extruder discharge pressure of up to 2,000 psi. To achieve this higher discharge pressure, there is provided a pressure augmenting system 156 including a rotary gear pump 160 in direct communication through conduit 162 with heater 164 positioned at the discharge end of rotary extruder 14. Heater 164 is an electrical resistance type heater to provide the necessary heat to insure the thermoplastic material remains in the melt state through pump 160. Rotary gear pump 160 which has a discharge pressure of about 2,000 psi discharges through a die 162. Rotary gear pump 160 is driven by an electrical DC drive motor 170 having an output of approximately 15 hp acting through a variable speed belt 164 to a reduction gear 172 which in turn drives chain 166 to obtain the desired extrusion pressure through die 162. Surprisingly, an additional advantage of pump augmenting system 156 is a reduction in back pressure from the die 26 into the housing 22 due to some "sucking action" by pump 160. The decreased back pressure results in decreased housing 22 internal pressures which in turn reduce the tendency for melt to travel along the rotor shaft to housing end plates. The combination of the pump rings 82, 84 and pump augmenting system 156 effectively eliminates any leakage of thermoplastic melt around end plates 104, 106.

Various other modifications and refinements may be made in the apparatus described herein without departing from the concept of the present invention. It should be noted that the concepts of the present invention are not limited to the processing of thermoplastic material. Any type of rotary device having a leakage problem may utilize the rechanneling concept illustrated by the grooved pump rings and rotor of the present invention. As the viscosity of the material within the device decreases, the rotational speed of the rotor would need to increase; however, for more viscous materials, the rotational speed would be decreased. When extruding viscous thermoplastic material, this rechanneling concept has been found to work at rotational speeds as low as 100 rpm; therefore, pumps transporting viscous materials such as oil which experience leakage from the ends of the housing would benefit from the concepts of the present invention. Therefore, the apparatus described herein and depicted in the accompanying drawings is exemplary only and is not intended to limit the scope of the invention.

What is claimed is:

1. Apparatus for plasticizing thermoplastic material and the like, comprising:
   a. a housing having a generally elliptical inner recess, an inlet, and a die aperture communicating with said recess;
   b. an extrusion member rotatably mounted in said recess in said housing, said extrusion member comprising a cylindrical rotor disposed within said generally elliptical recess to define a first clearance zone and an opposing second smaller clearance zone, both said clearance zones extending along the axial length of said roller between the inner surface of said housing and the outer surface of said rotor;
   c. means for axially rotating said rotor to plasticize the thermoplastic material within said clearance zones and to deliver the plasticized material from said clearance zones through said die aperture; and
   d. means, positioned between and in communication with the die aperture and said housing, for increasing the pressure of thermoplastic melt through said die aperture and reducing the internal pressure within said housing.

2. The apparatus of claim 1 wherein the pressure increasing means comprises a rotary gear pump.

* * * * *

UNITED STATES PATENT AND TRADEMARK OFFICE
CERTIFICATE OF CORRECTION

PATENT NO. : 4,813,863

DATED : MARCH 21, 1989

INVENTOR(S) : Granville J. Hahn; Raleigh N. Rutledge

It is certified that error appears in the above-identified patent and that said Letters Patent is hereby corrected as shown below:

Column 1, Line 63:
    Delete [55%] and insert -- 15% --

Column 12, Claim 1, Line 36:
    After inlet, delete [,]

Column 12, Claim 1, Line 44:
    Delete [roller] and insert -- rotor --

Signed and Sealed this

Twenty-eighth Day of November 1989

*Attest:*

JEFFREY M. SAMUELS

*Attesting Officer*      *Acting Commissioner of Patents and Trademarks*